Aug. 2, 1949.    L. DODULES    2,477,586
COOKING AND FRYING DEVICE
Filed Oct. 20, 1944    2 Sheets-Sheet 1

Inventor
LOUIS DODULES
By Soterios Nicholson
Attorney

Aug. 2, 1949.  L. DODULES  2,477,586
COOKING AND FRYING DEVICE
Filed Oct. 20, 1944  2 Sheets-Sheet 2
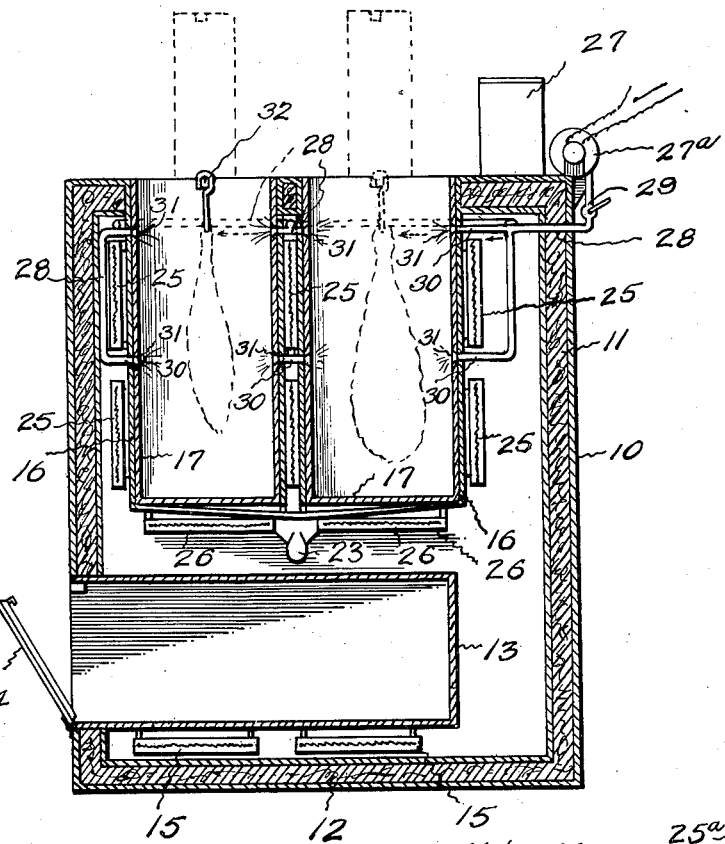
Fig.3.
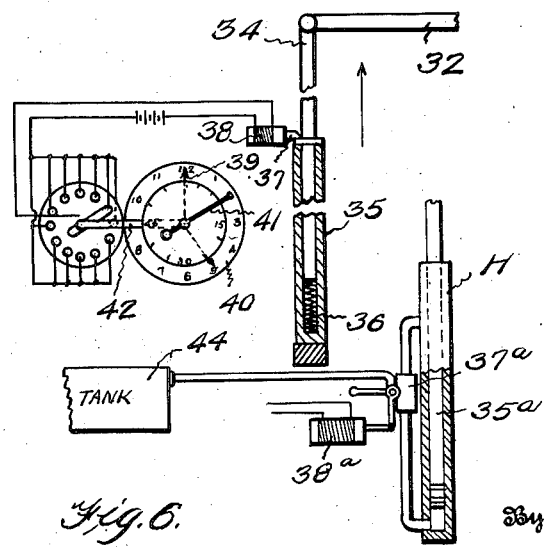
Fig.4.
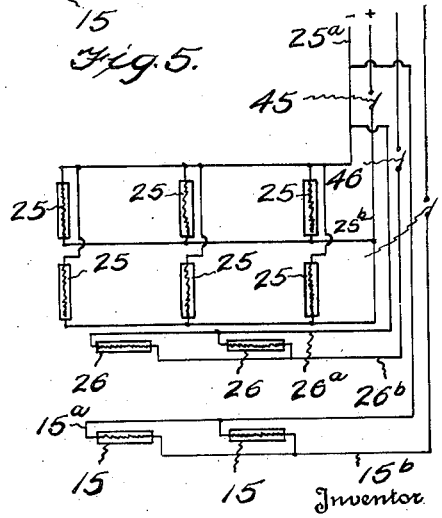
Fig.5.
Fig.6.
Inventor
LOUIS DODULES
By Soterios Nicholson
Attorney Patented Aug. 2, 1949

2,477,586

UNITED STATES PATENT OFFICE 2,477,586

COOKING AND FRYING DEVICE

Louis Dodules, Washington, D. C.

Application October 20, 1944, Serial No. 559,590

1 Claim. (Cl. 99—345)

This invention relates to a cooking and frying device, and has for one of its objects the production of an electrical cooking and frying device which will thoroughly cook meat, poultry, and the like, within a container and at a predetermined time automatically lift the cooked articles of food out of the cooking container to prevent the articles of food from becoming overdone.

Another object of this invention is the production of a simple and efficient cooking and frying device wherein the heating elements are mounted within an insulated cabinet or container which container supports removable drip pans to facilitate cleaning of the cabinet.

A further object of this invention is the production of a simple and efficient means for spraying the articles of food such as meat, poultry, and the like, with fat or oil, while these articles of food are suspended within the cooking or frying device.

Other objects and advantages of the present invention will appear throughout the following specification and claims.

In the drawings:

Figure 3 is a transverse sectional view;

Figure 4 is a diagrammatic view of the electrical circuit for the time-controlled releasing device for the suspension unit;

Figure 5 is a diagrammatic view of the electrical circuit controlling the heating units;

Figure 6 is a diagram of a modified form of plunger release or lifting mechanism.

Figure 1:
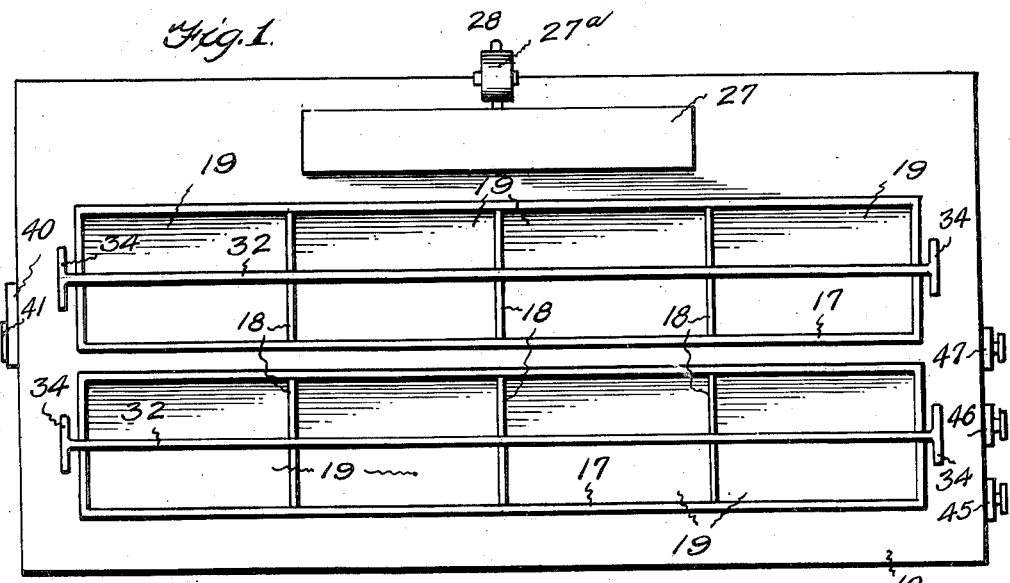
Figure 1 is a top plan view of the device.
Figure 2:
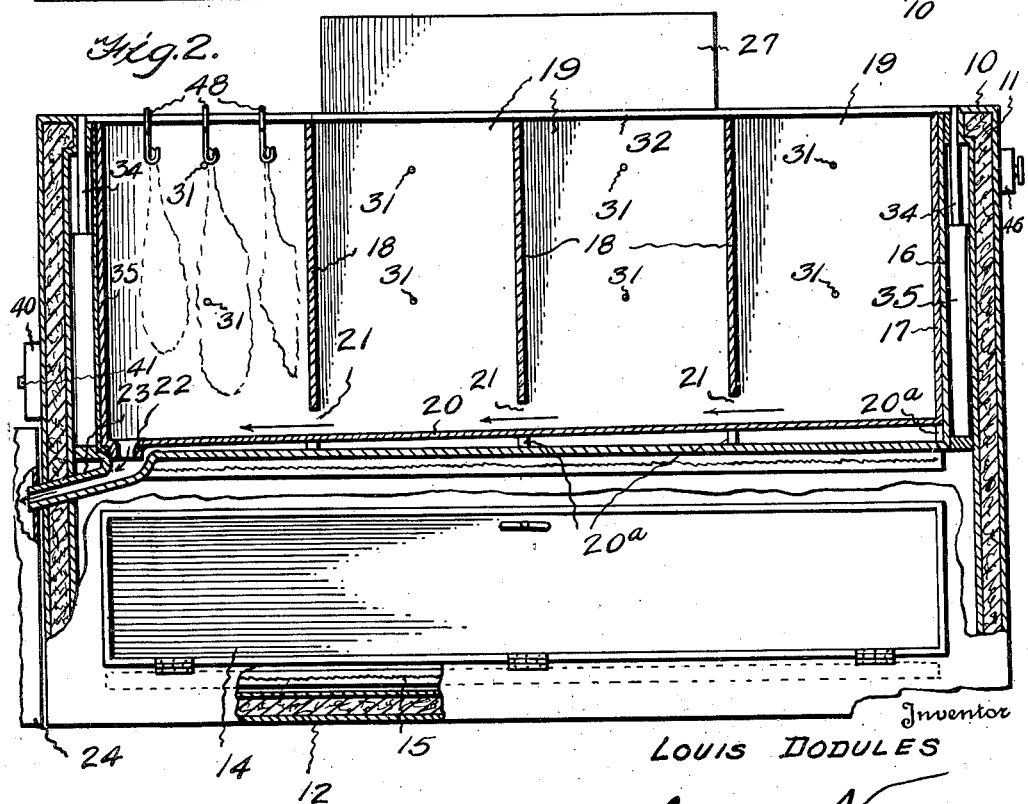
Figure 2 is a longitudinal sectional view, certain parts being shown in elevation.

By referring to the drawings, it will be seen that 10 designates a heating cabinet, preferably having insulated walls 11 and an insulated bottom 12. An oven 13 is carried in the bottom of the cabinet 10, and is provided with a suitable door 14 at its front end. Heating elements 15 of an electrical type are located below the oven 13, as shown in Figures 2 and 3.

A pair of longitudinally extending parallel compartments 16 are formed in the heating cabinet. A drip pan 17 is removably mounted in each compartment 16 and these pans may be lifted out of the compartments when so desired for the purpose of cleaning the pans and the compartments. Each pan 17 is provided with a plurality of spaced partitions 18 for dividing the pans into a plurality of separated chambers 19. The lower end of each partition 18 is spaced from the bottom 20 of the pan to provide communicating passageways 21 between the bottom portions of the chambers 19. The bottom 20 of each pan is inclined toward the drain outlet 22 located at one end of each pan. The drain outlet 22 communicates with a drain spout 23 which drain spout passes through the end of the cabinet 10 to a receptacle 24 to deposit the drainage accumulated grease or fat flowing through the outlet 22 and spout 23. Suitable legs or lugs 20a support the elevated portions of the inclined bottom 20.

A series of electrical heating units 25 are located near each side wall of each compartment 16, and a series of electrical heating units 26 are located near and below the bottoms of the compartments 16. A fat or oil container 27 is carried at any suitable location upon the cabinet 10, preferably on the top thereof, as shown. A suitable pump 27a of any type preferably electrically operated is connected to the container 27 and to a series of spray pipes 28 for forcing oil or fat in liquid form through the spray pipes 28. A suitable valve 29 is provided to control the flow of oil, etc., from the pipes 28. The spray pipes 28 are connected to suitable outlets 30 which extend through the side walls of the compartments 16 and terminate flush therewith.

The removable pans 17 are provided with spray apertures 31 which may be flared if desired, for spraying liquefied fat or oil from the spray outlets 30. The apertures 31 are so located as to register with the outlets 30 when the pans 17 are snugly fitted into the compartments 16, as shown in Figure 3.

A food suspension rod 32 is supported longitudinally of the open top of each compartment 16 and pan 17, and the pans 17 and cabinet 10 are notched to receive the rods 32, as at 33, so that the rods 33 may lie flush with the top of the cabinet 10, and pans 17, when the rods are in a lowered position. Each rod 32 is supported at each end by a plunger 34 which may be of greater width than the rod 32. Each plunger fits within a casing 35 and rests at its lower end upon an expansion spring or springs 36 which normally urge the plungers upwardly.

Any suitable locking and releasing mechanism may be used for holding the plungers 34 in a retracted position and releasing the plungers, such for instance as the conventional time-controlled device shown in Figure 4. Any suitable release may be provided but one form is shown wherein a latch 37 is illustrated and is controlled by a solenoid 38 which in turn is electrically actuated when a circuit is closed between the hand 39 of the clock 40 contacting the setting arm 41 of the time-setting device 42. Suitable contacts of a conventional circuit, as shown, are closed as the hand 39 contacts the arm 41 energizing the solenoid 38 and releasing the latch 37, thereby causing the plunger 34 or plungers 34 to be lifted by the spring or springs 36 to an elevated position.

I do not desire to limit this invention to any particular type of time control mechanism since many types of mechanism may be used without departing from the spirit of the invention. Therefore, only one type of mechanism has been shown. If desired, the time control mechanism shown in Figure 4 may be used to automatically actuate an hydraulic lifting mechanism H if desired, as shown in Figure 6, wherein a cylinder 35$^a$ carries a plunger 34$^a$ controlled through the valve 37$^a$ which in turn is actuated by the solenoid 38$^a$ from a circuit such as is shown in Figure 4. A hand-operated lever 43 may also be used to manually operate the valve 37 if desired. A source of hydraulic pressure 44 may be connected to the valve 37$^a$, as shown in Figure 6.

The heating elements 25 are electrically connected to a source of electrical supply through wires 25$^a$ and 25$^b$ and may be turned on and off by a switch 45. The heating elements 26 are electrically connected to a source of electrical supply through wires 26$^a$ and 26$^b$, and may be turned on and off by switch 46. The heating elements 15 are electrically connected to a source of electrical supply through wires 15$^a$ and 15$^b$ and may be turned on and off by switch 47. The elements 25, 26 and 15 may be individually controlled through the switches 45, 46 and 47.

In operation, the rods 32 which support the hooks 48 to which the meat etc., may be secured, as shown in dotted lines, are lowered to the position shown in full lines in Figures 2 and 3. The time i. e., ten minutes is sets on the time clock 40 by setting arm 41. At the end of ten minutes the latch 38 will be released and the rods 32 are automatically raised to an elevated position to lift the meat etc., vertically out of the pans 17. The meat etc., may be sprayed from time to time with oil, fat, and the like, during the process of cooking by starting the motor 27$^a$ and opening the valve 29 and the heat may be controlled during cooking by operating the switches 45 and 46. After cooking, the meat etc., may be placed in the warming oven and the heat may be controlled in the oven by operating the switch 47.

Having described the invention, what I claim is:

A device of the class described comprising a container having a cooking compartment, the compartment having an upper end and a lower drainage end, means for suspending an article to be cooked from said upper end within said compartment away from the sides of the compartment, pressure means located upon opposite sides of said compartment in opposed relation for spraying the article which is being cooked simultaneously from opposite sides thereof with a basting fluid transversely of the compartment from a plurality of vertically spaced spraying apertures throughout the length of the article which is being cooked, said pressure spraying means having one aperture located near the top of the compartment and another aperture located at a point approximately midway of the length of the article which is being cooked near its greatest bulk to evenly distribute the basting fluid throughout the article and to insure an even cooking of the article in its entirety.

LOUIS DODULES.

REFERENCES CITED

The following references are of record in the file of this patent:

UNITED STATES PATENTS

| Number | Name | Date |
|--------|------|------|
| 842,749 | Baguley | Jan. 29, 1907 |
| 1,258,995 | Demuth | Mar. 12, 1918 |
| 1,312,833 | Colias | Aug. 12, 1919 |
| 1,497,826 | Zaloom | June 17, 1924 |
| 1,694,762 | Ackerman | Dec. 11, 1928 |
| 1,732,010 | Goodell | Oct. 15, 1929 |
| 2,109,796 | Hirschenfeld | Mar. 1, 1938 |
| 2,181,847 | Finizio | Nov. 28, 1939 |

FOREIGN PATENTS

| Number | Country | Date |
|--------|---------|------|
| 11,571 | Great Britain | 1891 |
| 25,267 | Great Britain | 1907 |